March 19, 1968  A. J. HILGERT  3,373,772
FLUID SYSTEM AND A RESTRICTOR THEREFOR
Filed Nov. 17, 1964
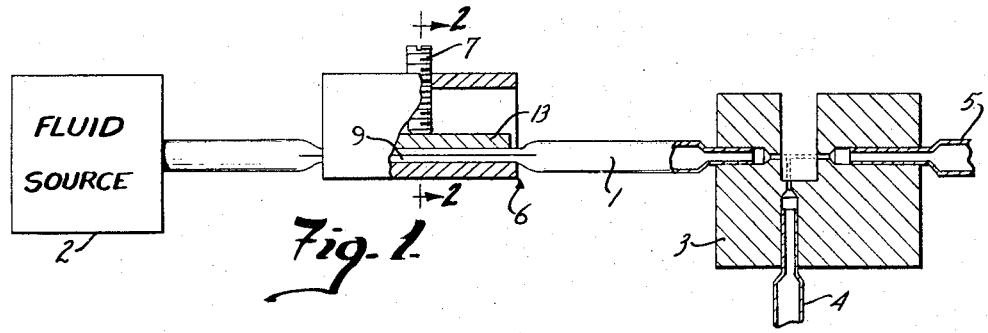
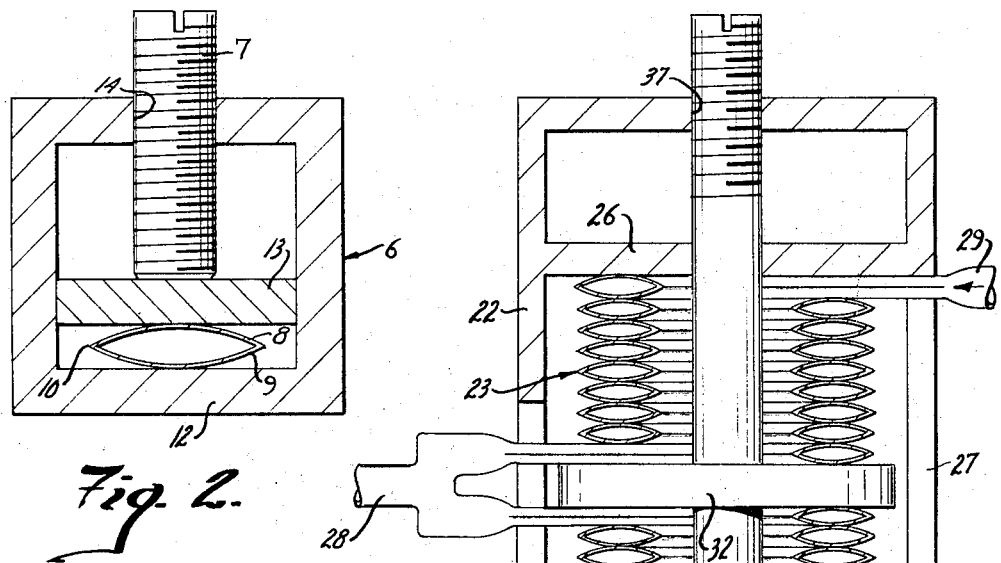
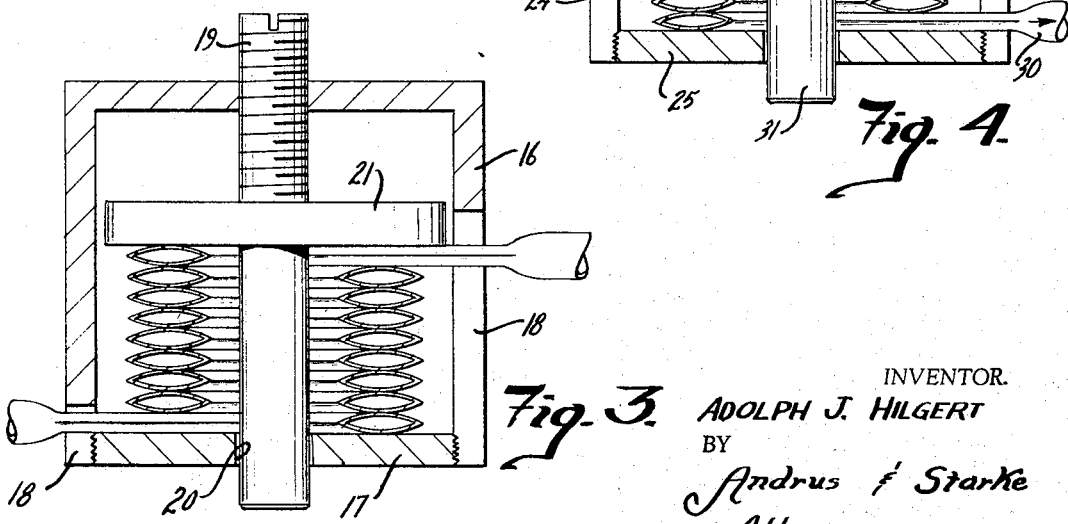
INVENTOR.
ADOLPH J. HILGERT
BY
Andrus & Starke
Attorneys United States Patent Office 3,373,772
Patented Mar. 19, 1968

3,373,772
FLUID SYSTEM AND A RESTRICTOR THEREFOR
Adolph J. Hilgert, Mequon, Wis., assignor to Johnson Service Company, Milwaukee, Wis., a corporation of Wisconsin
Filed Nov. 17, 1964, Ser. No. 411,768
5 Claims. (Cl. 138—43)

ABSTRACT OF THE DISCLOSURE

A pure fluid control system includes a fluid source connected to an impact modulator or other fluid modulating device through a special restrictor. The restrictor is a tubular metallic member having a generally oval cross section terminating in very sharply defined side edges. A collar encircles the restrictor section and includes a generally flat surface parallel to the plane through the side edges of the restrictor. A movable plate rests on the opposite surface of the restrictor within the collar and a screw threads and acts on the plate to selectively compress the restrictor to establish a selected pressure drop. The restrictor in a particularly useful and novel arrangement is coiled in a spiral manner to provide adjacent convolutions disposed between a base plate and a movable plate. To provide a potentiometer type control, the coiled restrictor is disposed within a chamber with a centrally located movable plate.

---

This invention relates to a fluid system and a restrictor therefor and particularly to a variable fluid restrictor for varying the pressure drop in a fluid path in a very highly accurate and linear manner.

Pure fluid control systems have recently received substantial interest. In pure fluid control systems, main fluid streams are controlled by streams of relatively small flow or pressures. Such systems can be interconnected to provide fluid amplification, modulation and the like generally similar to the electronic circuitry. However, the control of the fluid pressures and flows in a linear manner such as readily accomplished in electrical circuitry is not readily available in a small, compact and simple pneumatic unit or device.

Various systems of fluid flow and pressure control are of course well known. For example, an adjustable capillary system is disclosed in U.S. Patent 2,422,921 wherein a flattened tube is adjustably carried on a rotatable shaft and the shaft is rotated such that rotation of the shaft will increase or decrease the size of the capillary passages in the tubing. This requires a special means for winding of the tube upon a shaft member and is not particularly adapted to provision of a small, compact assembly. Alternatively, various means for compressing and releasing a resilient rubber line tubing has been suggested for example as shown in U.S. Patent 2,865,591. Although prior art devices have been available for varying the pressure controls, they have not been particularly adapted or directed to the provision of providing a highly accurate and linear output control unit for use in pure fluid amplifying systems.

The present invention is thus particularly directed to a variable linear pneumatic resistor or restrictor unit and one which particularly may be formed as a small compact assembly without loss of control accuracy or reliability.

Generally, in accordance with the present invention, a small, thin-wall tube of metal or other similar suitable material is provided with a generally oval cross section having sharp side edges. An adjustable control force is applied across the principal plane extending through the sharp side edges of the oval cross section to selectively flatten the cross sectional tube. The cross sectional area is thereby changed between the maximum unloaded condition and zero. It has been found that this provides a very accurate and reliable flow restrictor. The linearity is particularly obtained where the internal cross sectional area and the length of the tubing is selected to maintain the Reynolds number less than 2000.

As the resistance effect is also a function of the length of the tubing, a highly desirable form of the present invention includes the tubing wound as a spiral coil with adjacent convolutions in immediate touching relationship. A clamp or pressure adjusting means provides an axial pressure to the opposite ends of the spring unit to simultaneously compress and release the various cross sectional convolutions.

In connection with this latter construction, a potentiometer type fluid restrictor can readily be formed with fixed stops on the opposite ends of the spring unit and a movable wall positioned generally intermediate the spring unit. Movement of the movable wall in one direction causes compression of one half of the coil and simultaneous release of the opposite half. The input signals or the signals may be connected across the ends of the tube with an output tap generally intermediate or centrally thereof.

The present invention thus provides a linear pneumatic resistor or restrictor element which is particularly adapted to be incorporated in a pure fluid control device or system.

The drawing furnished herewith illustrates preferred embodiments of the present invention and clearly illustrates the several features and advantages heretofore discussed as well as others which will be readily understood from the following description.

In the drawing:

FIG. 1 is a side elevational view of a pneumatic restrictor constructed in accordance with the present invention with parts broken away and sectioned to show details of construction;

FIG. 2 is a vertical section through the restrictor taken on line 2—2 of FIG. 1;

FIG. 3 is a vertical section through a coil type restrictor constructed in accordance with the present invention; and FIG. 4 is a view similar to FIG. 3 illustrating a pneumatic potentiometer constructed in accordance with the present invention.

Referring to the drawing and particularly to FIG. 1, a main flow line 1 is shown connected to a suitable pressurized fluid source 2 and to a fluid amplifier or modulator 3. Although the fluid modulator 3 may be of any suitable construction, it is generally shown as a three terminal device having an input connected to source 2 to establish a main fluid stream of air or other suitable fluid and a control line 4 establishing a perpendicularly related stream to provide for controlled deflection of the main stream and thereby varying the output at line 5. A variable impedance or flow restrictor 6 is formed or otherwise provided in the flow line 1 and includes an adjustable set screw 7 to permit presetting of the pressure of the main stream of the modulator 3.

In operation, the pressure of the main stream determines the maximum output at the output line 5. By adjustment of the restrictor 6, the maximum output pressure is preset between a maximum and minimum pressure. The precise output pressure will vary with the signal from the control line 4 as the result of deflection of the main stream with respect to the orifice to output line 5, in accordance with known theories of operation.

The present invention is particularly directed to the construction of the restrictor 6 which is more fully described as follows.

Generally, the illustrated restrictor 6 includes a length of flattened tubing 8 shown forming an integral portion of line 1 for simplicity of illustration. The tubing 8 is formed of a suitable thin resilient metal but of sufficient strength to be essentially self-supporting and to withstand the pressure of source 2. The control section of tubing 8 is preformed into a generally oval shape having sharp feathered edges 9 and 10 at the ends of the oval. The flow line and particularly the control section 8 is connected in series in the main flow line 1 such that the fluid stream supplied to the pure fluid modulator 3 is controlled by the pressure drop through the tubing 8.

In accordance with the illustrated embodiment of the invention, a tubular collar or frame 11 having a rectangular cross section encircles the control tubing 8 and includes a base portion 12 generally contiguous and coextensive with the lower face of tubing 8. A movable jaw 13 is disposed within the frame 11 bearing on the opposite side or face of the tubing 8. Screw 7 is threaded through the outer wall of the collar 11, as at 14, and bears on the movable jaw 13. Threading of the screw 14 through the collar 11 forces jaw 13 toward the base portion 12 to compress tubing 8, reduce the cross section of the flow path and thereby increase the resistance to flow and pressure drop through the tubing 8.

In operation, the flow restrictor 6 is connected in the flow line 1 and the various necessary pressures and flows for the system determined. The adjustable screw 14 is then preset to establish the maximum output pressure desired of the modulator 3. The sharp edges 9 and 10 of tubing 8 have been found to provide a highly unusual construction and one which readily permits reducing of the cross sectional area to zero, if desired.

A highly accurate and reliable linear flow relationship is obtained by providing a selected interrelationship between the cross sectional flow area and the length of the tubing 8. Generally, the cross sectional area and the length of the tubing for any given fluid is selected such that the Reynolds number is less than 2000 or the flow is laminar or streamlined. Tests have shown that with this construction, a highly linear variation with pressure is obtained. This result is of unusual significance in connection with pure fluid amplifying devices where linear control of the pressures is practically essential in order to simulate similar electronic controls.

As is well known, the length of the tubing 8 will also control the pressure drop because the resistance to flow is a function thereof. To maintain a compact small unit, the oval section of the tubing 8 can be constructed as shown in FIG. 3. As shown therein, the section of tubing 8 is wound as a spiral coil 15 with a plurality of adjacent convolutions in immediate touching engagement. The coil 15 is shown disposed within a generally cup-shaped housing 16 having a removable bottom wall 17 removably secured as by a threaded connection or the like. The opposite ends of the coil 15 project through suitable slots 18 in the side wall of the housing 16. A set screw 19 is adjustably threaded within the top wall or base of housing 16 in axial alignment with the coil 15. The set screw 19 passes through coil 15 and an appropriate opening 20 in wall 17 with a cylindrical head or flange 21 bearing on the top plane of the coil 15. Threading of the set screw 19 inwardly causes the simultaneous collapsing or flattening of the several convolutions between the flange 21 and the wall 17. Withdrawal of the set screw 19 releases the tubing of coil 15 which returns to its normal unloaded configuration in accordance with the positioning of the set screw. Generally, the fluid output of coil 15 provides a similar action to that of the previously described embodiment.

In control and similar pneumatic systems, a potentiometer type signal generation similar to the conventional electrical potentiometer is often desirable. In accordance with the present invention, a potentiometer output control may be provided by the construction shown in FIG. 4.

As shown in FIG. 4, a tubular housing 22 is provided with a pair of serially connected spiral coils 23 and 24 clamped between a removable bottom wall 25 and an integral intermediate wall 26. Each of the spiral coils 23 and 24 is similarly constructed of a flattened tubing spirally wound similar to that of FIG. 3 and the ends of the spiral sections 23 and 24 project outwardly through suitable slots 27 in the side wall of the housing 22. The adjacent central ends of spiral coils 23 and 24 are connected to a common tap member or tube 28. The upper end of coil 23 is shown by a conventional arrow as an inlet end 29 and the lower end of coil 24 is similarly shown as an outlet end 30. A plunger 31 is coaxially mounted within the housing 22 and includes a central outwardly projecting flange 32 disposed immediately between the sections 23 and 24. The upper end of the plunger 31 is threaded through a correspondingly threaded opening in the outermost wall, as at 33.

The assembly is constructed such that the coils 23 and 24 are both partially compressed with the flange 32 located in a central standby position. In operation, the threading of the plunger 31 axially of the housing 22 and therefore coils 23 and 24 cause the simultaneous compression of one coil and release of the other.

As the plunger 31 is moved upwardly, the convolutions in the upper coil 23 are compressed to a closed or partially closed position. The convolutions in the lower coil 24 are correspondingly released to a partial or fully opened flow position. The pressure at the tap 28 therefore more closely approaches that of outlet 30 and in the limit essentially equals the pressure thereof. In the limit position, the upper coil 23 is completely closed off and the only difference in pressure between taps 28 and 30 is the slight pressure drop due to the flow through a conduit.

Similarly, the opposite positioning of the plunger 31 causes further compression of the lower coil 24 and release of the upper coil 23 to thereby vary the pressure at tap 28 in the direction of the pressure at tap 29 and in the limit provide essentially the same pressures. The pressure at the common tap 28 can therefore be made to vary substantially between the pressures at the inlet 29 and the outlet 30 by proper positioning of the plunger 31.

A true fluid potentiometer system can therefore be provided and by construction of the coil sections in accordance with the principal features of the present invention, a linear output pressure or flow obtained.

The present invention thus provides an adjustable flow restrictor having particular and unusual application to pure fluid controls or the like.

Various modes of carrying out the invention are contemplated as being within the scope of the following claims particularly pointing out and distinctly claiming the subject matter which is regarded as the invention.

I claim:
1. A fluid restrictor unit, comprising:
   a metal tube wound in the form of an elongated coil of multiple convolutions with adjacent convolutions in engagement, said metal tube having an oval cross section with sharp side edges and being wound on one of said edges, and
   adjustable control means bearing axially on the opposite ends of the coil and movable axially of the coil for varying the effective cross sectional flow area within the convolutions and thereby varying the pressure drop therethrough.

2. The fluid restrictor unit of claim 1 having pressure taps connected to at least three axially spaced positions of said coil including an intermediate tap constituting an output tap, and said control means includes means to oppositely change the effective cross sectional flow area of the convolutions to opposite sides of the intermediate tap.

3. The restrictor unit of claim 1 wherein the length of the tube and the internal cross section are selected to maintain laminar flow therethrough.

4. The pneumatic flow restrictor unit of claim 2 wherein said control means includes:
   an adjustable clamp unit having outer bearing members engaging the coil to opposite sides of the outer taps and an inner bearing member adjacent the intermediate tap, and means to relatively move the inner bearing member axially to simultaneously compress and release the tube to the opposite sides thereof and thereby vary the pressure at the output tap.

5. In a fluid control system, comprising:

a pure fluid modulating device having an input terminal, a metal tube wound in the form of an elongated coil of multiple convolutions with adjacent convolutions in engagement, each convolution having an oval cross section with sharp side edges and being wound on one of said edges, and adjustable control means bearing axially on the opposite ends of the coil and movable axially of the coil for varying the effective cross sectional flow area of the convolutions and thereby varying the pressure drop therethrough.

References Cited

UNITED STATES PATENTS

| | | | |
|---|---|---|---|
| 2,422,921 | 6/1947 | Niev et al. | 138—46 X |
| 2,447,920 | 8/1948 | Terry | 138—43 |
| 2,582,917 | 1/1952 | Aagaard | 138—43 X |
| 2,604,119 | 7/1952 | Hughes | 138—43 |
| 2,827,919 | 3/1958 | Rice et al. | 251—5 X |
| 2,838,949 | 6/1958 | Grigsby | 251—8 |
| 2,865,591 | 12/1958 | Holinshead | 251—8 |

FOREIGN PATENTS 193,419   11/1938   Switzerland.

LAVERNE D. GEIGER, *Primary Examiner.*

B. KILE, *Assistant Examiner.*